June 17, 1930.  T. L. DIGGINS  1,765,005
STUBBLE REMOVER AND SEED BED FERTILIZER
Filed Oct. 13, 1928  2 Sheets-Sheet 1
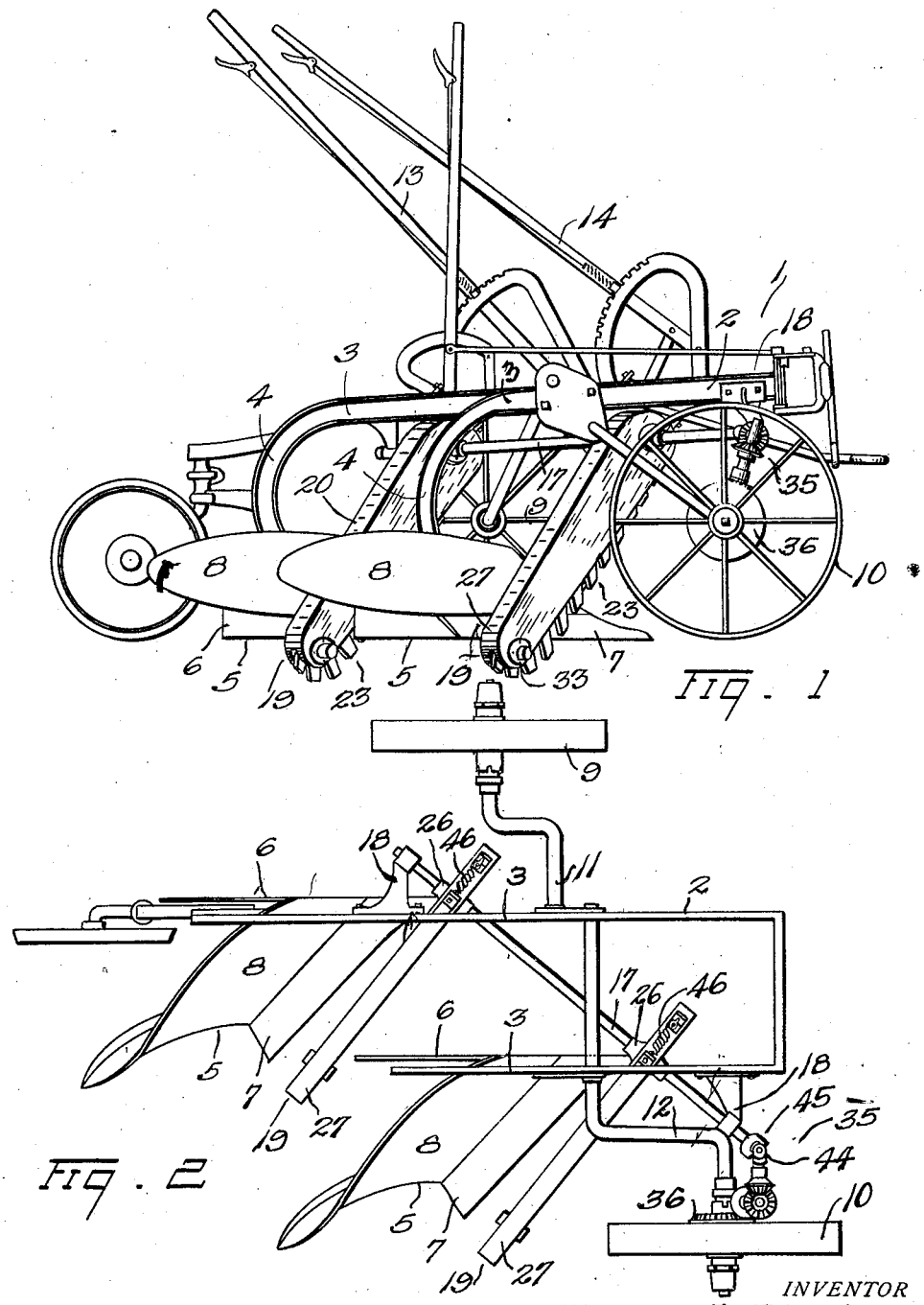
INVENTOR
BY *Thomas L. Diggins*
ATTORNEY

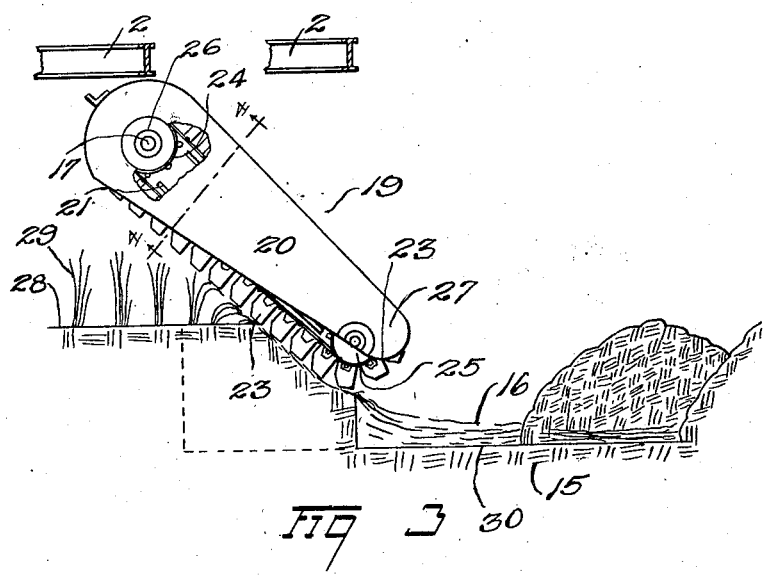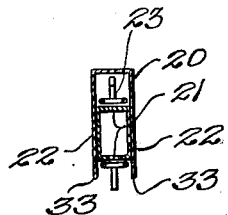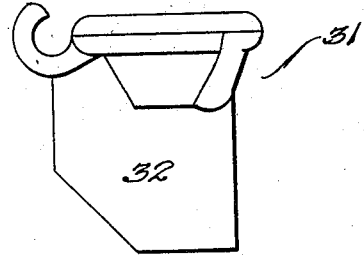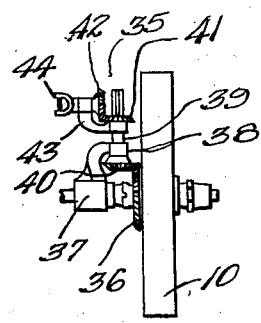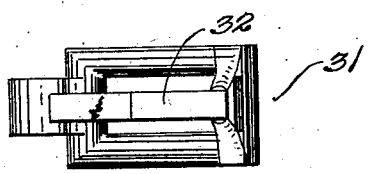

Patented June 17, 1930

1,765,005

UNITED STATES PATENT OFFICE

THOMAS L. DIGGINS, OF MILTON, OREGON, ASSIGNOR OF ONE-HALF TO ERNEST HARRIS, OF SEATTLE, WASHINGTON

STUBBLE REMOVER AND SEED-BED FERTILIZER

Application filed October 13, 1928. Serial No. 312,313.

This invention relates to stubble remover and seedbed fertilizer and has as one of its objects to provide a stubble remover and seedbed fertilizer that will remove stubble, other vegetation, and fertilizer forming matter from soil and deposit it in a manner for fertilization purposes.

Another object of the invention is to provide a stubble remover and seedbed fertilizer that may operate in conjunction with a farm implement, and by its operation therewith prevent the implement from clogging, thus increasing its efficiency.

A further object of the invention is to provide a stubble remover and seedbed fertilizer that will remove the top soil and fertilizer forming matter from the surface and deposit it below the surface to provide a highly fertilized seedbed.

A further object of the invention is to provide a stubble remover and seedbed fertilizer that will deposit removed stubble in a manner to prevent its interfering with other farming operations, such as weeding, harrowing, etc., or the like.

With these and other objects in view reference is now made to the accompanying drawings in which—

Fig. 1 is a side elevation of a plow showing the device attached and in the operative position;

Fig. 2 is a plan view of a plow with the operating levers removed and showing the device and its relation to the plow;

Fig. 3 is a side elevation of the device showing its position with respect to the ground during operation;

Fig. 4 is a cross section of the device taken on the line 4—4 of Fig. 3;

Fig. 5 is a side elevation of a special link of the rake belt;

Fig. 6 is a plan view thereof; and

Fig. 7 is an angular view of the driving mechanism taken at a point perpendicular thereto.

Having reference to the drawings like numerals refer to like parts throughout the several views and the numeral 1 refers to a plow which, in this case, is illustrated as a gang plow comprising a frame 2 consisting mainly of two rearwardly extending and parallely positioned beams 3 whose extreme ends are curved, as at 4, to carry two plow bottoms 5, the latter consisting of the usual landsides 6, shares 7, and mold boards 8, the whole being supported by a landside wheel 9 and a furrow wheel 10 both of which wheels being utilized to support and level the frame by means of bent axles 11, and 12 respectively.

The plow shown herewith represents a two bottom plow and it must here be understood that where two or more bottoms are used that the same relative positions of the bottoms are maintained as in the illustrations herewith, and that even though a single bottom plow is used the position of the device to be herein described, and specified as forming this invention, will be readily seen as identical with that of the two or more bottoms as the specifications proceed.

And, with reference to the bent axles 10 and 11 respectively leveling will be accomplished in the usual manner by raising or lowering the wheels with the levers 13 and 14 respectively, leveling being for the purpose of maintaining the plow bottoms 5 in their proper position in the soil 15 during operation either on account of uneven surface conditions or from the fact that the furrow wheel 10 must of necessity travel in the previously constructed furrow 16 made by the preceding round of the plow.

Operably mounted on the frame 2 of the plow is a drive shaft 17. This shaft is rotatably mounted in journals 18 secured to the plow beams 3 as shown in Figs. 1 and 2, with the journals being secured thereto as shown and in a position that the drive shaft supported thereby will assume a diagonal position with respect to said frame 2 with the shaft further positioned forward of said bottoms 5 as shown in Fig. 2, and for a purpose to be explained.

Operably mounted on said shaft 13 in a manner to be explained, is a continuous raking means 19 consisting of a housing 20 formed as an inverted U, as shown in section in Fig. 4, and containing therein supporting runways 21 mounted and secured in said housing in a manner to brace the side walls 22 thereof and to support a chain rake 23 which will be presently explained.

The housing contains sprocket wheels 24 and 25 mounted in its respective ends and the chain rake 23 mentioned is trained over said sprocket wheels in a manner to provide continuous movement thereto during the operation of the plow.

For the purpose of this operation the housing 20 is provided at one end with a journal 26 adapted to receive the hub of the sprocket wheel 24 and at the same time be capable of a sliding movement on the shaft 17 whereby the raking means may be adjustably secured and supported upon the shaft for the proper positioning of that member with respect to the plow bottoms.

For the purpose of this positioning the housing 20 is adjusted on the shaft 17 with this end of the housing raised for the purpose of securement on the shaft and with its opposite end 27 lowered and extended in a general parallel direction with respect to the share 7 of the plow bottoms 5, and in a generally lateral direction with respect to the plow 1, thus providing a position where the lower end 27 of the rake will rest to the side of the plow bottom, in front of which it is positioned, and in the adjacent furrow 16 previously made as above explained.

It is now obvious that were the plow to move forward, as when in operation, that were the rake to be set in motion that a raking or scraping movement over the top 28 of the unturned soil would gradually wear away the surface soil and with it any vegetation or other material conducive to fertilization which might lay thereon, thus removing such vegetation as stubble 29 and thereby preventing its accumulation and the curved portion 4 of the beam in bunches which accumulation frequently packs therein requiring a cessation of operation for considerable time while removing this congestion, which is accomplished with considerable manual effort and delay before operation can be resumed.

And further, this method of removing the top dirt 28 disposes of the top material at the bottom 30 of the furrow 16 there to provide a fertilizer for future use with the fertilizer being positioned at the bottom of the seedbeds which are formed and which extend upward from the bottom of the furrows.

To successfully accomplish this result the raking means includes as its chain 23 special links 31 which go to make up the rake proper and these links comprise the usual link adapted for engagement with sprocket wheels and have substantially constructed teeth 32 preferably formed integral therewith in such a manner as to provide a substantial rake for the purpose, and to prevent clogging the rake in its housing, with the stubble or other vegetation, the lower edges 33 of the housing are tapered, as shown in Fig. 3, with its lower sprocket wheel 25, thereby to gradually force any of the material adhering to the teeth 32 off the ends thereof thus preventing the stubble from being drawn into the housing and providing trouble. The eccentric position of this lower end 27 may be as shown, or any other arrangements of a similar nature may be adopted without departing from the spirit of the invention.

To operate this device a driving means 35 is utilized which is operably connected with the shaft 17 and furrow wheel 10 and to compensate for the leveling adjustment of this wheel the device consists of a bevel gear 36 which is attached to the furrow wheel for rotation therewith during the movement of the plow over the ground, and loosely mounted on the bent axle 12 of this wheel is a bracket 37 bent in a general upward direction and terminating at the upper end in a journal 38. Mounted in this journal is a short shaft 39 provided on its lower end with a bevel pinion 40 adapted to engage the bevel gear and having its upper end splined as shown for sliding engagement with a second pinion 41, adapted in turn to engage a third pinion 42 arranged perpendicularly thereto, with the two last named pinions being held in register by a bracket 43 in the usual manner of such construction, and positioned opposite to the last named pinion and secured to its shaft (not shown) is a portion 44 of a universal joint 45 whose complemental part will be suitably secured to the forward end of the said shaft 17. Obviously a casing (not shown) for said gears and pinions may be utilized to protect them from the dust and dirt if desired and providing for the safety of the operator.

While the raking means 19 has as a rule sufficient weight to automatically dig itself into the ground springs 46 or other means may be secured to the housing and to the plow beams respectively for the purpose of yieldingly maintaining the rake in a proper position for operation.

It is further obvious that a lever means (not shown) may be used to raise the rake to an inoperative position if desired.

In use the plow is drawn over the land in the usual manner and with the first round made the forward rake may be raised to an inoperative position by securing it in any suitable manner as by fastening it to a beam with wire or other means or by use of the lever last mentioned.

The forward plow bottom now provides a furrow for the second rake which now operates as above explained.

On the second round or where there has been a furrow previously made all rakes will be placed to the position as shown in Fig. 1.

It will be noted by referring to this Fig. 1 that the bevel gear 36 has a greater diameter than the associated pinion 40 and hence the speed of the continuous rake is increased over the normal speed of travel of the plow, which increase of speed operates to prevent any appreciable side draft to the rake caused by the forward movement of the plow or caused by side pressure against the rake due to its position and angular relation with respect to the frame, and its perpendicular relation to the drive shaft which is also angularly positioned with respect to the frame.

As the furrow wheel is adjusted to the position shown in Fig. 1 during the initial round of operation and as this wheel will be moved in a circular arc to the lower position when in the bottom of the furrow the spline shaft 39 above mentioned is constructed to slide in the second mentioned pinion thereby automatically adjusting itself to drive the raking means in any adjusted position of the supporting wheels without effecting the proper leveling of the plow.

Having thus described my invention I claim—

1. In stubble remover and seedbed fertilizer, the combination with a plow comprising a frame, supported by wheels and provided with plow bottoms, of a raking means having an endless chain which can be driven operably mounted on said frame, and extended to rest in an adjacent furrow, and means operably connected with said wheels to drive said rake.

2. In stubble remover and seedbed fertilizer, the combination with a plow comprising a frame, supported by wheels, and provided with plow bottoms, of a driven raking means operably mounted on said frame, and extended in a general parallel direction with respect to the share of said plow bottoms, and to rest in an adjacent furrow, and means operably connected with said wheels to drive said raking means.

3. In stubble remover and seedbed fertilizer, the combination with a plow comprising a frame, supported by wheels and provided with plow bottoms, of a shaft operably mounted on said frame and positioned diagonally thereof, a continuous raking means operably mounted on said shaft before each plow bottom, and extended perpendicular to said shaft and in a generally parallel direction with respect to the shares of said bottoms, and directed to rest in the adjacent furrow, a cleaning means for said raking means, and means operably connected with said wheels to operate said raking means.

4. In stubble remover and seedbed fertilizer, the combination with a plow comprising a frame, supported by wheels and provided with plow bottoms, of a shaft mounted on said frame and positioned diagonally thereof, and forward of said bottoms, a housing adjacent each plow bottom and mounted on said shaft for slidable adjustment thereon, sprocket wheels mounted in said housing, a continuous rake mounted in said housing and on said sprocket wheels, and extended in a general lateral direction to rest in the adjacent furrow, a cleaning means for said rake formed by said housings, and means operably connected with said wheels to operate said shaft.

5. In stubble remover and seedbed fertilizer, the combination with a plow comprising a frame, supported by wheels, and provided with plow bottoms, of a drive shaft journaled to said frame and raking means consisting of a housing having a raised and a lowered end, sprocket wheels mounted in the respective ends, a continuous chain rake trained over said sprocket wheels, supporting runways mounted in said housing to support the chain rake, the upper end of said housing and its sprocket wheel being mounted on said shaft and adapted for sliding adjustment, and positioned to rest the lower end of said rake in the adjacent furrow, a cleaning means formed on the lower end of said housing, and a driving means operably connecting said shaft with one of said plow wheels and arranged to drive the raking means in any adjusted position of the supporting wheels.

In testimony whereof I affix my signature.

THOMAS L. DIGGINS.